W. D. NASH.
SEPARATOR.
APPLICATION FILED MAY 23, 1912.
1,071,076.
Patented Aug. 26, 1913.
2 SHEETS—SHEET 2.
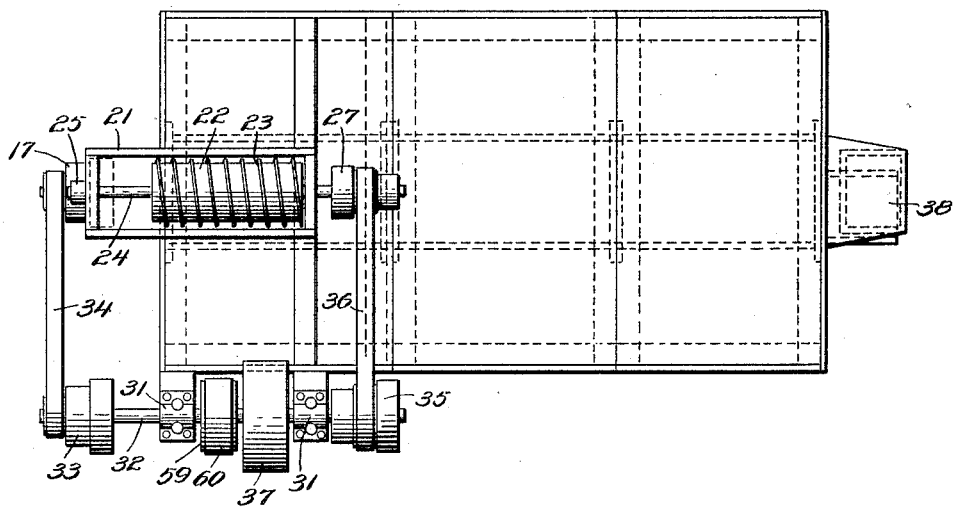
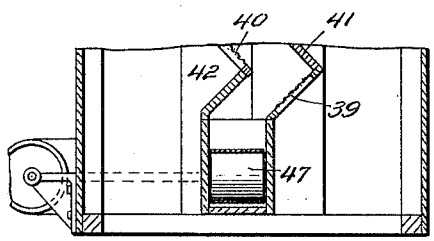
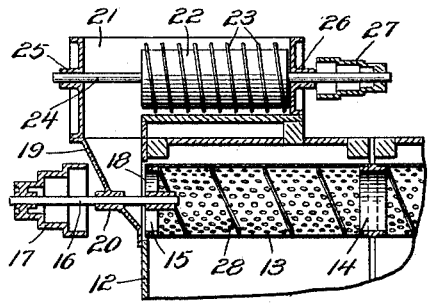
Witnesses
F. C. Gibson.
B. M. Kent.
Inventor
Walter D. Nash
by Foster Freeman Watson & Coit
Attorneys

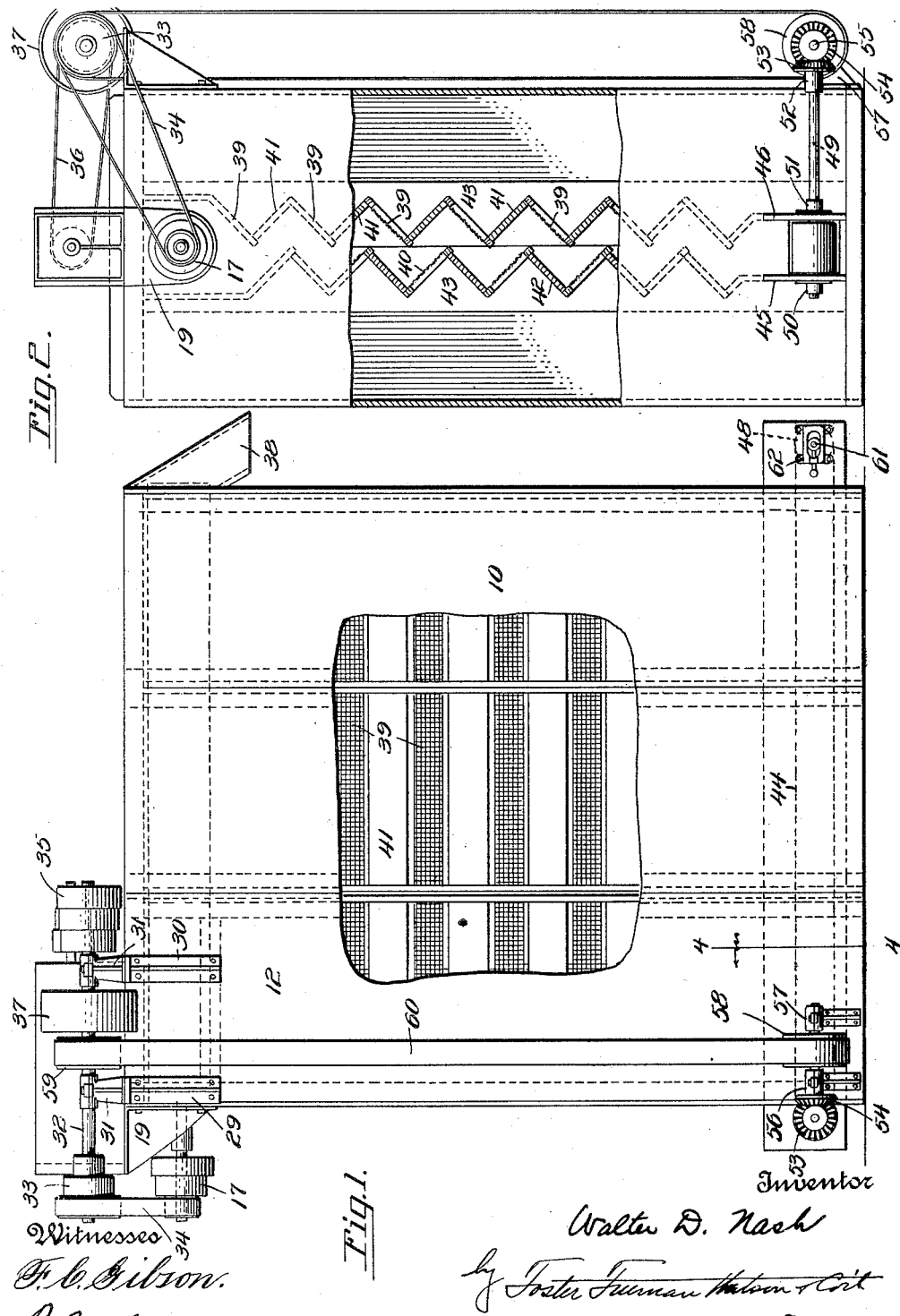

UNITED STATES PATENT OFFICE.

WALTER D. NASH, OF ATLANTA, GEORGIA, ASSIGNOR TO ATLANTA UTILITY WORKS, OF EAST POINT, GEORGIA, A CORPORATION OF GEORGIA.

SEPARATOR.

1,071,076.      Specification of Letters Patent.      Patented Aug. 26, 1913.

Application filed May 23, 1912. Serial No. 699,343.

*To all whom it may concern:*

Be it known that I, WALTER D. NASH, a citizen of the United States, residing at Atlanta, Fulton county, State of Georgia, have invented certain new and useful Improvements in Separators, of which the following is a specification.

This invention relates to separators and more particularly to separators which are adapted to separate grains and seeds from sand, dust, dirt and other foreign substances.

The machine is especially adapted for separating cotton seed from the locks of cotton, shucks and like material.

The objects of the invention are to provide a machine which requires a minimum amount of power to operate, has a high cleaning efficiency, and is simple in construction.

Generally speaking the machine comprises a horizontally arranged revolving cylindrical screen which receives the seeds mixed with the foreign substances and carries the same therethrough, the seeds and dirt passing through the perforations and the locks, shucks, etc., pass out the discharge end of the screen. The seeds and dirt which pass through the perforations of the cylindrical screen fall onto a series of inclined stationary screens which separate the seeds from the sand and dirt and discharge the seeds onto a suitable conveyer which delivers them to any desired point.

The novel features of the invention will be apparent from the following description taken in connection with the accompanying drawings, in which:

Figure 1 is a side elevation of the machine with a portion of the outer casing broken away to show the arrangement of the screens on the interior thereof. Fig. 2 is an end elevation of the machine with a portion of the casing broken away. Fig. 3 is a plan of the machine. Fig. 4 is a fragmentary section on the line 4—4 of Fig. 1. Fig. 5 is a fragmentary longitudinal section through the feeding mechanism and the revolving cylindrical screen.

Referring to the drawing, 10, 11 and 12 indicate the sections of a casing, these sections preferably being in the form of a rectangular prism and taken together constitute a single casing for the machine. Supported in the upper part of the casing formed by the sections 10, 11 and 12 is a cylindrical screen 13 formed of sections corresponding with the casing sections and jointed together by suitable rings 14. At one end of the screen 13 is a spider 15, in which is secured a driving shaft 16 having at its outer end a cone-driving pulley 17. An opening 18 is formed in the end wall of the section 12 adjacent the end of the screen 13 and secured to the end wall of the casing is a feeding hopper or spout 19 adapted to feed the material to be screened through the opening 18 into the screen 13. The hopper 19 is provided with a bearing 20 for the shaft 16 and has communication at its top with a feeder box 21 in which is arranged a feeder drum 22 having on its exterior a spirally arranged rib 23. The drum 22 is mounted on a shaft 24, which is arranged in suitable bearings 25 and 26 in the ends of the box and carries on one end outside of the box a cone-driving pulley 27. The screen 13 is supported at one end by means of the bearing 20 and may also be supported by suitable guides or roller bearings (not shown) engaging the outer surface of the connecting rings 14. The screen 13 is provided with an internal spirally arranged rib 28 which is adapted to serve as a feeding means for carrying the material to be screened along the screen to the discharge end.

Arranged on the exterior of the casing 12, preferably near the top thereof are the brackets 29 and 30 which support bearings 31 for a driving shaft 32. Arranged on the shaft 32 is a cone pulley 33 which drives the pulley 17 by means of a belt 34, a cone pulley 35 which drives the pulley 27 by means of a belt 36 and a pulley 37 by means of which the shaft 32 is driven from any suitable source of power. At the discharge end of the cylindrical screen 13 the section 10 of the casing carries a delivery spout 38. Arranged directly below the cylindrical screen 13 is a zig-zag passage formed by the series of inclined screens 39 and 40. The screens 39 are arranged directly above each other and are spaced apart by the boards 41 which are inclined substantially at right angles to the screens. The screens 40 are arranged one above the other and so placed relative to the screens 39, that the material will be alternately thrown from one set of screens to the other in its downward passage.

When the material strikes the screens the sand and dirt will pass through the screens and striking the boards 41 or 42 will be thrown to the bottom of the casing at the sides of the zig-zag passage. The screens 39 and 40 and the boards 41 and 42 may be supported in any suitable manner by means of upright members 43 arranged at the ends of the sections, these members being secured to the sections. At the bottom of the casing and below the zig-zag passage above referred to may be arranged a conveyer of any preferred construction. In the form of the invention illustrated I have shown a belt conveyer 44 arranged between the side boards 45 and 46 and passing over suitable pulleys 47 and 48 arranged at the ends of the casing. The pulley 47 is preferably arranged on a shaft 49 supported in bearings 50, 51 and 52. The shaft 49 carries a bevel gear 53 which meshes with a corresponding gear 54 carried by a shaft 55 arranged in bearings 56 and 57 and provided with a driving pulley 58. The pulley 58 may be driven from a pulley 59 on the shaft 32 by means of a belt 60. The pulley 48 may be arranged on a shaft 61 mounted in adjustable bearings 62, this arrangement permitting adjustment of the tension of the belt 44.

From the drawings and the above description it will be seen that I have provided a machine which is adapted to feed the material to be screened at any desired rate by adjusting the belt 36 on the cone pulleys 27 and 35 and that all of the moving parts of the machine are driven by means of a single belt from the source of power. The speed of the screen 13 may be adjusted within wide limits by means of the belt 34 and the cone pulleys 17 and 33. In using the machine in connection with other machines which operate on the seeds after they have been screened it will be seen that the separator may be adjusted to screen and feed the seeds at any desired rate. Furthermore, by regulating the speed of the screen 13 the distribution of the seeds over the inclined screens 39 and 40 may be changed to suit any existing conditions. The screen 13 will carry all of the locks and trash which may be mixed with the seeds to the spout 38 and the seeds which fall through the screen 13 will be thoroughly cleaned by being alternately thrown from one side of the zig-zag passage, formed by the screens 39 and 40, to the other. This arrangement of the stationary screens thoroughly separates the sand and dirt from the seeds and therefore the color of the lint on the seeds will be improved, thereby increasing its value.

The casing may be made of wood or any other suitable material and by forming the same in sections the machine is conveniently arranged for shipping and the size of the machine may be regulated by increasing the number of intermediate sections corresponding to the section 11.

Having thus described the invention what is claimed as new is:

1. In a machine of the class described, the combination of a sectional casing, cylindrical screens arranged in the upper part of said casing sections, means connecting said screens together whereby they are adapted to form one continuous screen, a plurality of stationary screens carried by each casing section and arranged below said cylindrical screens in zig-zag formation whereby the material is caused to flow from one screen to another by gravity, feeding means arranged on one of said casing sections, and means carried by said last mentioned section for operating said feeding means and said cylindrical screen.

2. In a machine of the class described, the combination of a casing formed of separable sections, a cylindrical screen formed of separable sections and arranged in the upper part of said casing, means for revolving said screen, a plurality of screens carried by each of said casing sections and arranged in zig-zag formation and adapted to receive the material passing through said revolving screen and a conveyer extending longitudinally of the casing and adapted to receive the screened material from all of said screens.

3. In a machine of the class described, the combination of a casing formed of separable sections, a revolving screen formed of separable sections and arranged in the upper part of said casing, a plurality of stationary screens carried by each of said sections and arranged in zig-zag formation below said revolving screen, feeding means for said revolving screen carried by one of said sections, a conveyer arranged in the lower part of said casing and adapted to receive the material from said stationary screens, a power shaft carried by the section of the casing having said feeding means thereon, means carried by said section for operating said conveyer, and means whereby said feeding means and said conveyer operating means are driven from said shaft.

In testimony whereof I affix my signature in presence of two witnesses.

WALTER D. NASH.

Witnesses:
A. MACPHERSON YOLE,
ROBT. E. HARKEY.

---

Copies of this patent may be obtained for five cents each, by addressing the "Commissioner of Patents, Washington, D. C."